(12) United States Patent
Arechederra

(10) Patent No.: US 10,227,482 B2
(45) Date of Patent: Mar. 12, 2019

(54) FLAME RETARDANT POLYMER COMPOSITIONS

(71) Applicants: PolyAd Services LLC, Earth City, MO (US); Robert Arechederra, Ballwin, MO (US)

(72) Inventor: Robert Arechederra, Ballwin, MO (US)

(73) Assignee: BYK USA INC., Wallingford, CT (US)

( * ) Notice: Subject to any disclaimer, the term of this patent is extended or adjusted under 35 U.S.C. 154(b) by 182 days.

(21) Appl. No.: 14/651,236

(22) PCT Filed: Dec. 5, 2013

(86) PCT No.: PCT/US2013/073335
§ 371 (c)(1),
(2) Date: Jun. 11, 2015

(87) PCT Pub. No.: WO2014/099397
PCT Pub. Date: Jun. 26, 2014

(65) Prior Publication Data
US 2015/0322252 A1 Nov. 12, 2015

Related U.S. Application Data

(60) Provisional application No. 61/835,893, filed on Jun. 17, 2013, provisional application No. 61/739,842, filed on Dec. 20, 2012.

(51) Int. Cl.
| | |
|---|---|
| *C08L 23/12* | (2006.01) |
| *C08K 13/02* | (2006.01) |
| *C09K 21/08* | (2006.01) |
| *C08K 3/20* | (2006.01) |
| *C08K 5/00* | (2006.01) |
| *C08K 5/02* | (2006.01) |
| *C08K 5/3435* | (2006.01) |
| *C08K 3/01* | (2018.01) |

(52) U.S. Cl.
CPC ............ *C08L 23/12* (2013.01); *C08K 3/01* (2018.01); *C08K 3/20* (2013.01); *C08K 5/0008* (2013.01); *C08K 5/0066* (2013.01); *C08K 5/02* (2013.01); *C08K 5/3435* (2013.01); *C08K 13/02* (2013.01); *C09K 21/08* (2013.01); *C08L 2201/02* (2013.01); *C08L 2201/08* (2013.01)

(58) Field of Classification Search
CPC ....................................................... C08L 23/12
USPC ........................................................ 524/408
See application file for complete search history.

(56) References Cited

U.S. PATENT DOCUMENTS

| | | | |
|---|---|---|---|
| 4,000,114 A | 12/1976 | Gordon | |
| 4,010,139 A | 3/1977 | Bertelli et al. | |
| 4,353,820 A | 10/1982 | Lindvay | |
| 4,710,528 A * | 12/1987 | Bertelli | C08K 3/08 524/100 |
| 6,372,831 B1 | 4/2002 | Sikkema | |
| 2003/0207969 A1* | 11/2003 | Capocci | C08K 5/0066 524/236 |
| 2005/0267261 A1* | 12/2005 | Plaver | C08L 23/02 525/191 |
| 2007/0004831 A1 | 1/2007 | Ottaviani | |
| 2011/0152412 A1* | 6/2011 | Hogt | C08K 5/01 524/101 |

FOREIGN PATENT DOCUMENTS

| | | |
|---|---|---|
| EP | 13864772 | 4/2016 |
| JP | 51-065153 S | 10/1975 |
| JP | 51-65153 S | 10/1975 |
| JP | 61-185409 S | 8/1986 |
| JP | 2002-234964 | 8/2002 |
| JP | 110072 | 3/2017 |
| JP | 424390 | 9/2017 |
| TW | 102147618 | 4/2017 |
| WO | WO2005/118697 | 12/2005 |
| WO | 2011/005819 A1 | 1/2011 |
| WO | 2012/087905 A2 | 6/2012 |
| WO | 2012/127463 A1 | 9/2012 |
| WO | 2014/099397 A1 | 12/2013 |

OTHER PUBLICATIONS

Felix et al. "Comparison of bismuth trioxide and antimony trioxide as synergists with decabromodiphenyl ether in flame reardancy of high-impact polystyrene", Journal Fire Science, Sep. 6, 2012, 566-574, 30-6.

Costa et al. "Mechanism of Condensed Phase Action in Fire Retardant Bismuth Compound- Chloroparaffin-Polypropylene Mixtures: Part I—The Role of Bismuth Trichloride and Oxychloride", Polymer Degradation and Stability. 1986. v.14 159-164.

* cited by examiner

*Primary Examiner* — Doris L Lee
(74) *Attorney, Agent, or Firm* — Taft Stettinius & Hollister LLP; Stephen F. Rost

(57) ABSTRACT

The present disclosure is aimed at flame retardant thermoplastic polymer compositions. The flame retardant compositions are advantageously antimony free. The compositions contain an effective flame retarding amount of a combination of one or more bismuth compounds selected from the group consisting of bismuth oxychloride, bismuth oxyfluoride, bismuth oxybromide, bismuth oxyiodide and bismuth oxynitrate and one or more organobromine flame retardants, for instance decabromodiphenyl ether (decabromodiphenyl oxide) or tris[3-bromo-2,2-bis(bromomethyl)propyl]phosphate. The thermoplastic polymer is for instance polypropylene, polyethylene, polystyrene, polypropylene/polyethylene copolymer or thermoplastic olefin. The present formulations advantageously contain no antimony trioxide and achieve V0 according to the UL 94 flammability test.

17 Claims, No Drawings

FLAME RETARDANT POLYMER COMPOSITIONS

CROSS-REFERENCE TO RELATED APPLICATIONS

This application is a National Stage Application of PCT/IB2013/073335 filed on Dec. 5, 2013, entitled "FLAME RETARDANT POLYMER COMPOSITIONS", which designates the United States of America and which claims priority to, and the benefit of, U.S. Provisional Application 61/739,842 filed Dec. 20, 2012, entitled "Antimony Free Flame Retardant Polymer Compositions" and U.S. Provisional Application 61/835,893 filed Jun. 17, 2013, entitled "Antimony Free Flame Retardant Polymer Compositions", all of which are incorporated herein by reference in their entirety.

The present invention is aimed at flame retardant polymer compositions, especially thermoplastic polymer compositions. The invention pertains to flame retardant polymer compositions comprising certain bismuth compounds, e.g. BiOCl, in combination with traditional organobromine flame retardants.

Combinations of antimony compounds, for example antimony trioxide, with halogenated flame retardants are known to perform exceptionally well in thermoplastic polymers. However, antimony compounds are under increasing regulatory pressure due to toxicity and carcinogenic properties.

It has surprisingly been found that certain bismuth compounds, such as bismuth oxychloride, when used in combination with organobromine flame retardants, provides thermoplastic polymers outstanding flame retardancy, even surpassing combinations with antimony trioxide.

Bismuth oxychloride is completely non-toxic and non-carcinogenic.

Accordingly, a subject of this invention is a flame retardant composition which comprises
a) a thermoplastic polymer substrate and
b) an effective flame retarding amount of a combination of
  one or more bismuth compounds selected from the group consisting of bismuth oxychloride, bismuth oxyfluoride, bismuth oxybromide, bismuth oxyiodide and bismuth oxynitrate and
  one or more organobromine flame retardants.

Another subject of this invention is a method for providing a flame retardant polymer composition, said method comprising incorporating into a thermoplastic polymer substrate an effective flame retarding amount of a combination of
  one or more bismuth compounds selected from the group consisting of bismuth oxychloride, bismuth oxyfluoride, bismuth oxybromide, bismuth oxyiodide and bismuth oxynitrate and
  one or more organobromine flame retardants.

A further subject of this invention is a flame retardant additive composition comprising one or more bismuth compounds selected from the group consisting of bismuth oxychloride, bismuth oxyfluoride, bismuth oxybromide, bismuth oxyiodide and bismuth oxynitrate and one or more organobromine flame retardants.

DETAILED DISCLOSURE

The thermoplastic polymer substrate is any of a wide variety of polymeric types including polyolefins, polystyrenics, polyvinylchloride, polyamides and polyesters. For example, the polymer substrate may be selected from the group of resins consisting of polyolefins, thermoplastic olefins, styrenic polymers or copolymers, acrylonitrile-butadiene-styrene (ABS), polyamides and polymers which contain hetero atoms, double bonds or aromatic rings. Specific embodiments are where the thermoplastic polymer is polypropylene, polyethylene, thermoplastic olefin (TPO), ABS, high impact polystyrene or polyethylene terephthalate or polyimide.

For example, the polymer substrate is selected from the group of resins consisting of polyolefins, thermoplastic olefins, styrenic polymers or copolymers, ABS, polyesters, polyamides, polycarbonates and blends thereof.

Another embodiment of the present invention is where the polymer substrate is selected from the group consisting of polypropylene, polyethylene, thermoplastic olefin (TPO), ABS, high impact polystyrene, polycarbonate and polyethylene terephthalate.

The polymer substrate may also be thermoplastic polyurethane, thermoplastic elastomer, polymethylmethacrylate, rubbers, polyesters, polyacrylonitrile or polyoxymethylene.

Preferably, the polymer substrate is polypropylene, polyethylene or thermoplastic olefin (TPO). The thermoplastic polymer is more preferably a polyolefin like polyethylene, polypropylene or copolymers thereof. The thermoplastic polymer is most preferably polypropylene (PP). Polyethylene is preferably linear low density (LLDPE), low density (LDPE) or high density (HDPE). Mixtures of polypropylene with polyethylene are suitable substrates, for example PP/HDPE, PP/LDPE and mixtures of different types of polyethylene (for example LDPE/HDPE). Ethylene/propylene copolymers are also suitable substrates (polypropylene/polyethylene copolymers).

TPOs are for instance blends of polypropylene homopolymers and impact modifiers such as EPDM or ethylene/alpha-olefin copolymers. TPO is for example about 10 to about 90 parts propylene homopolymer, copolymer or terpolymer, and about 90 to about 10 parts (by weight) of an elastomeric copolymer of ethylene and a $C_3$-$C_8$ alpha-olefin. The elastomeric copolymer is for instance ethylene/propylene copolymer (EPM) or ethylene/propylene/non-conjugated diene (EPDM). TPO is disclosed for example in U.S. Pat. No. 6,048,942, incorporated by reference.

Further examples of suitable thermoplastic polymers are:
1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, for example polyethylene and polypropylene, can be prepared by different, and especially by the following, methods:
a) radical polymerization (normally under high pressure and at elevated temperature).
b) catalytic polymerization using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated.

These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic; for example atactic polymers. Stereoblock polymers are also included.

5. Polystyrene, poly(p-methylstyrene), poly(α-methylstyrene).

6. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; for example atactic polymers. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; for example atactic polymers. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.
13. Polyacetals such as polyoxymethylene and those polyoxymethylenes which contain ethylene oxide as a comonomer; polyacetals modified with thermoplastic polyurethanes, acrylates or MBS.
14. Polyphenylene oxides and sulfides, and mixtures of polyphenylene oxides with styrene polymers or polyamides.
15. Polyurethanes derived from hydroxyl-terminated polyethers, polyesters or polybutadienes on the one hand and aliphatic or aromatic polyisocyanates on the other, as well as precursors thereof.
16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).
17. Polyureas, polyimides, polyamide-imides, polyetherimids, polyesterimids, polyhydantoins and polybenzimidazoles.
18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.
19. Polycarbonates and polyester carbonates.
20. Polyketones.
21. Polysulfones, polyether sulfones and polyether ketones.
22. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

Bismuth oxychloride, BiOCl, is a known pigment, available for instance from BASF under the tradename MEARLITE. Bismuth oxychloride pigments are known for use in cosmetic and personal care products.

Likewise, BiOF, BiOBr, BiOI and BiO(NO$_3$) are all commercially available.

Preferably, the present compositions and methods comprise bismuth oxycloride or bismuth oxynitrate, most preferably bismuth oxychloride.

The bismuth compounds are present for instance from about 0.5% to about 10% by weight, based on the weight of the thermoplastic polymer. Preferably, the bismuth compounds are present from about 1% to about 7% and most preferably from about 1% to about 5% by weight, based on the weight of the thermoplastic polymer. The bismuth compounds may be present from about 1%, 2%, 3%, 4%, 5%, 6%, 7%, 8% or about 9% to about 10% by weight, based on the weight of the thermoplastic polymer.

The organobromine flame retardants include any organic bromine compound capable of generating HBr or bromine radicals during thermal degradation.

The organobromine flame retardants include, without limitation, tetrabromobisphenol A (TBBPA) and its derivatives such as esters, ethers, and oligomers, for example tetrabromophthalate esters, bis(2,3-dibromopropyloxy)tetrabromobisphenol A, brominated carbonate oligomers based on TBBPA, brominated epoxy oligomers based on condensation of TBBPA and epichlorohydrin, and copolymers of TBBPA and 1,2-dibromoethane; dibromobenzoic acid, dibromostyrene (DBS) and its derivatives; ethylenebromobistetrabromophthalimide, dibromoneopentyl glycol, dibromocyclooctane, trisbromoneopentanol, tris(tribromophenyl) triazine, 2,3-dibromopropanol, tribromoaniline, tribromophenol, tetrabromocyclopentane, tetrabromobiphenyl ether, tetrabromodipentaerythritol, decabromodiphenyl ether, tetrabromophthalic anhydride, pentabromotoluene, pentabromodiphenyl ether, pentabromodiphenyl oxide, pentabromophenol, pentabromophenyl benzoate, pentabromoethylbenzene, hexabromocyclohexane, hexabromocyclooctane, hexabromocyclodecane, hexabromocyclododecane, hexabromobenzene, hexabromobiphenyl, octabromobiphenyl, octabromodiphenyl oxide, poly(pentabromobenzyl acrylate), octabromodiphenyl ether, decabromodiphenyl ethane, decabromodiphenyl, brominated trimethylphenylindan, tetrabromochlorotoluene, bis (tetrabromophthalimido)ethane, bis(tribromophenoxy) ethane, brominated polystyrene, brominated epoxy oligomer, polypentabromobenzyl acrylate, dibromopropylacrylate, dibromohexachlorocyclopentadienocyclooctane, N'-ethyl(bis)dibromononboranedicarboximide, tetrabrombisphenol S,N,N'-ethylbis(dibromononbornene)dicarboximide, hexachlorocyclopentadieno-bis-(2,3-dibromo-1-propyl) phthalate, brominated phosphates like bis(2,3-dibromopropyl)phosphate and tris(tribromoneopentyl) phosphate and tris(dichlorobromopropyl)phosphite, N,N'-ethylene-bis-(tetrabromophthalimide), tetrabromophthalic acid diol[2-hydroxypropyl-oxy-2-2-hydroxyethyl-ethyltetrabromophthalate], vinylbromide, polypentabromobenzyl acrylate, polybrominated dibenzo-p-dioxins, tris-(2,3-dibromopropyl)-isocyanurate, ethylene-bis-tetrabromophthalimide and tris(2,3-dibromopropyl)phosphate.

Suitable examples of commercially available brominated flame retardants include polybrominated diphenyl oxide (DE-60F), decabromodiphenyl oxide (decabromodiphenyl ether) (DBDPO; SAYTEX® 102E), tris[3-bromo-2,2-bis (bromomethyl)propyl]phosphate (PB 370®, FMC Corp. or FR 370, ICL/Ameribrom), tris(2,3-dibromopropyl)phosphate, tetrabromophthalic acid, bis-(N,N'-hydroxyethyl)tetrachlorphenylene diamine, tetrabromobisphenol A bis(2,3-dibromopropyl ether) (PE68), brominated epoxy resin, ethylene-bis(tetrabromophthalimide) (SAYTEX® BT-93), octabromodiphenyl ether, 1,2-bis(tribromophenoxy)ethane (FF680), tetrabromo-bisphenol A (SAYTEX® RB100), ethylene bis-(dibromo-norbornanedicarboximide) (SAYTEX® BN-451), tris-(2,3-dibromopropyle)-isocyanurate, hexabromocyclododecane, brominated polystyrene and EMERALD INNOVATION series from Chemtura, for example EMERALD INNOVATION 1000.

The organobromine flame retardant is preferably decabromodiphenyl ether, tris[3-bromo-2,2-bis(bromomethyl) propyl] phosphate or brominated polystyrene.

The organobromine flame retardant is present from about 1% to about 40% by weight, based on the weight of the thermoplastic polymer. Preferably, the organobromine flame retardant is present from about 3% to about 25% by weight, most preferably from about 3% to about 20% by weight, based on the weight of the thermoplastic polymer. The organobromine flame retardant is present from about 1%, 4%, 7%, 10%, 13%, 15%, 17%, 19% or about 23% to about 25% by weight, based on the weight of the thermoplastic polymer.

The combination of the bismuth compounds and one or more organobromine flame retardants is synergistic.

The composition of the present invention may further comprise a sterically hindered hydrocarbyloxyamine stabilizer. Sterically hindered hydrocarbyloxyamine stabilizers are known to advantageously be employed together with brominated flame retardants. Sterically hindered hydrocarbyloxyamine stabilizers are known as NOR hindered amine light stabilizers or NOR HALS.

They are disclosed for example in U.S. Pat. Nos. 5,004,770, 5,204,473, 5,096,950, 5,300,544, 5,112,890, 5,124,378, 5,145,893, 5,216,156, 5,844,026, 6,117,995, 6,271,377, 6,392,041, 6,376,584 and 6,472,456. The relevant disclosures of these patents and applications are hereby incorporated by reference.

U.S. Pat. Nos. 6,271,377, 6,392,041 and 6,376,584, cited above disclose hindered hydroxyalkoxyamine stabilizers. For the purposes of this invention, the hindered hydoxyalkoxyamine stabilizers are considered a subset of the hindered hydrocarbyloxyamine stabilizers. Hindered hydroxyalkoxyamine stabilizers are also known as N-hydroxyalkoxy hindered amines light stabilizers, or NORoI HALS.

Suitable sterically hindered hydrocarbyloxyamine light stabilizers are for example:

1-cyclohexyloxy-2,2,6,6-tetramethyl-4-octadecylaminopiperidine;
2,4-bis[(1-cyclohexyloxy-2,2,6,6-tetramethylpiperidin-4-yl)butylamino]-6-(2-hydroxyethyl-amino-s-triazine;
bis(1-cyclohexyloxy-2,2,6,6-tetramethylpiperidin-4-yl)adipate;
2,4-bis[(1-cyclohexyloxy-2,2,6,6-piperidin-4-yl)butylamino]-6-chloro-s-triazine;
1-(2-hydroxy-2-methylpropoxy)-4-hydroxy-2,2,6,6-tetramethylpiperidine;
1-(2-hydroxy-2-methylpropoxy)-4-oxo-2,2,6,6-tetramethylpiperidine;
1-(2-hydroxy-2-methylpropoxy)-4-octadecanoyloxy-2,2,6,6-tetramethylpiperidine;
bis(1-(2-hydroxy-2-methylpropoxy)-2,2,6,6-tetramethylpiperidin-4-yl)sebacate;
bis(1-(2-hydroxy-2-methylpropoxy)-2,2,6,6-tetramethylpiperidin-4-yl)adipate; and
2,4-bis{N-[1-(2-hydroxy-2-methylpropoxy)-2,2,6,6-tetramethylpiperidin-4-yl]-N-butyl-amino}-6-(2-hydroxyethylamino)-s-triazine;
the reaction product of 2,4-bis[(1-cyclohexyloxy-2,2,6,6-piperidin-4-yl)butylamino]-6-chloro-s-triazine with N,N'-bis(3-aminopropyl)ethylenediamine) [CAS Reg. No. 191680-81-6]; and
the compound of formula in which n is from 1 to 15. This compound is disclosed in example 2 of U.S. Pat. No. 6,117,995.

The NOR HALS are added to the thermoplastic polymer substrate at levels of from about 0.10% to about 10% by weight, based on the weight of the substrate.

The present compositions may contain further flame retardants. Further flame retardants include chlorinated flame retardants, phosphorus based flame retardants, metal hydroxide compounds, melamine based compounds, etc.

Chlorinated flame retardants are disclosed in U.S. Pat. Nos. 6,472,456, 5,393,812, 7,230,042 and 7,786,199. Chlorinated flame retardants are for example tris(2-chloroethyl)

phosphite, bis-(hexachlorocyloentadeno) cyclooctane, tris (1-chloro-2-propyl)phosphate, tris(2-chloroethyl)phosphate, bis(2-chloroethyl)vinyl phosphate, hexachlorocyclopentadiene, tris(chloropropyl)phosphate, tris(2-chloroethyl)phosphate, tris(chloropropyl)phosphate, polychlorinated biphenyls, mixtures of monomeric chloroethyl phosphonates and high boiling phosphonates, tris(2,3-dichloropropyl)phosphate, chlorendic acid, tetrachlorophthalic acid, poly-β-chloroethyl triphosphonate mixture, bis(hexachlorocyclopentadieno)cyclooctane (DECLORANE PLUS), chlorinated paraffins and hexachlorocyclopentadiene derivatives.

Phosphorus-containing flame retardants may be selected from phosphazene flame retardants, which are well known in the art and are disclosed for example in EP1104766, JP07292233, DE19828541, DE1988536, JP11263885, U.S. Pat. Nos. 4,079,035, 4,107,108, 4,108,805, and 6,265,599. Non-halogenated phosphorous-based flame retardants are compounds that include phosphorous, such as triphenyl phosphates, phosphate esters, phosphonium derivatives, phosphonates, phosphoric acid esters and phosphate esters, and those described in U.S. Pat. No. 7,786,199. Phosphorous-based flame retardants are usually composed of a phosphate core to which is bonded alkyl (generally straight chain) or aryl (aromatic ring) groups. Examples include red phosphorous, inorganic phosphates, insoluble ammonium phosphate, ammonium polyphosphate, ammonium urea polyphosphate, ammonium orthophosphate, ammonium carbonate phosphate, ammonium urea phosphate, diammonium phosphate, ammonium melamine phosphate, diethylenediamine polyphosphate, dicyandiamide polyphosphate, polyphosphate, urea phosphate, melamine pyrophosphate, melamine orthophosphate, melamine salt of dimethyl methyl phosphonate, melamine salt of dimethyl hydrogen phosphite, ammonium salt of boron-polyphosphate, urea salt of dimethyl methyl phosphonate, organophosphates, phosphonates and phosphine oxide. Phosphate esters include, for example, trialkyl derivatives, such as triethyl phosphate, tris(2-ethylhexyl)phosphate, trioctyl phosphate, triaryl derivatives, such as triphenyl phosphate, cresyl diphenyl phosphate and tricresyl phosphate and aryl-alkyl derivatives, such as 2-ethylhexyl-diphenyl phosphate and dimethyl-aryl phosphates and octylphenyl phosphate.

Other examples of phosphorous-based flame retardants include methylamine boron-phosphate, cyanuramide phosphate, magnesium phosphate, ethanolamine dimethyl phosphate, cyclic phosphonate ester, trialkyl phosphonates, potassium ammonium phosphate, cyanuramide phosphate, aniline phosphate, trimethylphosphoramide, tris(1-aziridinyl)phosphine oxide, bis(5,5-dimethyl-2-thiono-1,3,2-dioxaphosphorinamyl)oxide, dimethylphosphono-N-hydroxymethyl-3-propionamide, tris(2-butoxyethyl) phosphate, tetrakis(hydroxymethyl)phosphonium salts, such as tetrakis(hydroxymethyl)phosphonium chloride and tetrakis(hydroxymethyl)phosphonium sulfate, n-hydroxymethyl-3-(dimethylphosphono)-propionamide, a melamine salt of boron-polyphosphate, an ammonium salt of boron-polyphosphate, triphenyl phosphite, ammonium dimethyl phosphate, melamine orthophosphate, ammonium urea phosphate, ammonium melamine phosphate, a melamine salt of dimethyl methyl phosphonate, a melamine salt of dimethyl hydrogen phosphite and the like.

Metal hydroxide flame retardants include inorganic hydroxides, such as aluminum hydroxide, magnesium hydroxide, aluminum trihydroxide (ATH) and hydroxycarbonate.

Melamine-based flame retardants are a family of non-halogenated flame retardants that include three chemical groups: (a) melamine(2,4,6-triamino-1,3,5 triazine); (b) melamine derivatives (including salts with organic or inorganic acids, such as boric acid, cyanuric acid, phosphoric acid or pyro/poly-phosphoric acid); and (c) melamine homologues. Melamine derivatives include, for example, melamine cyanurate (a salt of melamine and cyanuric acid), melamine-mono-phosphate (a salt of melamine and phosphoric acid), melamine pyrophosphate and melamine polyphosphate. Melamine homologues include melam(1,3,5-triazin-2,4,6-triamine-n-(4,6-diamino-1,3,5-triazine-2-yl), melem(2,5,8-triamino 1,3,4,6,7,9,9b-heptaazaphenalene) and melon(poly[8-amino-1,3,4,6,7,9,9b-heptaazaphenalene-2,5-diyl).

Borate flame retardant compounds include zinc borate, borax (sodium borate), ammonium borate, and calcium borate. Zinc borate is a boron-based flame retardant having the chemical composition $xZnO_yB_2O_3 \cdot zH_2O$. Zinc borate can be used alone, or in conjunction with other chemical compounds, such as alumina trihydrate, magnesium hydroxide or red phosphorous. It acts through zinc halide or zinc oxyhalide, which accelerate the decomposition of halogen sources and promote char formation.

Silicon-based materials include linear and branched chain-type silicone with (hydroxy or methoxy) or without (saturated hydrocarbons) functional reactive groups.

Examples of powdered metal-containing flame retardant substances, which can be employed alone or in combination with other flame retardant substances, include, but are not limited to, magnesium oxide, magnesium chloride, talcum, alumina hydrate, zinc oxide, zinc borate, alumina trihydrate, alumina magnesium, calcium silicate, sodium silicate, zeolite, magnesium hydroxide, sodium carbonate, calcium carbonate, ammonium molybdate, iron oxide, copper oxide, zinc phosphate, zinc chloride, clay, sodium dihydrogen phosphate, tin, molybdenum and zinc.

Polytetrafluoroethylene (PTFE) is also contemplated as an additional flame retardant.

The present compositions may advantageously contain no antimony compounds, that is may advantageously contain no antimony oxide.

The other flame retardants and flame retardant synergists may be included in their usual amounts, such as up to 20% by weight, metal hydrates up to 70% by weight and fluoropolymer anti-dripping agents up to 1% by weight, all based on the weight of the polymer substrate.

Further additives may added to the polymer substrates of the invention. For instance, ultraviolet light (UV) absorbers selected from hydroxyphenylbenzotriazole, hydroxyphenyltriazine, benzophenone and benzoate UV absorbers, organic phosphorus stabilizers, hydroxylamine stabilizers, benzofuranone stabilizers, amine oxide stabilizers, hindered phenol antioxidants and/or hindered amine light stabilizers. The further additives are for instance employed at levels of about 0.1 to about 10% by weight, based on the weight of the polymer substrate.

Further additives are for instance selected from the group consisting of pigments, dyes, plasticizers, phenolic antioxidants, thixotropic agents, levelling assistants, basic costabilizers, nitrone stabilizers, amine oxide stabilizers, benzofuranone stabilizers, UV absorbers, sterically hindered amine light stabilizers, metal passivators, metal oxides, organophosphorus compounds and hydroxylamines.

In particular, further additives are selected from the organic phosphorus stabilizers, hindered phenol antioxidants, hydroxylamines, hindered amines and UV absorbers.

The organic phosphorus stabilizers are for example known phosphite and phosphonite stabilizers and include triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl)phosphite, bis(2,4-di-α-cumylphenyl)pentaerythrtitol diphosphite, diisodecyl pentaerythritol diphosphite, bis(2,4-di-tert-butylphenyl)pentaerythritol diphosphite (D), bis(2,6-di-tert-butyl-4-methylphenyl)pentaerythritol diphosphite (E), bisisodecyloxy-pentaerythritol diphosphite, bis(2,4-di-tert-butyl-6-methylphenyl)pentaerythritol diphosphite, bis(2,4,6-tri-tert-butylphenyl)pentaerythritol diphosphite, tristearyl sorbitol triphosphite, tetrakis (2,4-di-tert-butylphenyl)4,4'-biphenylene-diphosphonite (H), 6-isooctyloxy-2,4,8,10-tetra-tert-butyl-dibenzo[d,f][1,3,2]dioxaphosphepin (C), 6-fluoro-2,4,8,10-tetra-tert-butyl-12-methyl-dibenzo[d,g][1,3,2]dioxaphosphocin (A), bis(2,4-di-tert-butyl-6-methylphenyl) methyl phosphite, bis(2,4-di-tert-butyl-6-methylphenyl) ethyl phosphite (G), 2,2',2"-nitrilo[triethyltris(3,3'5,5'-tetra-tert-butyl-1,1'-biphenyl-2,2'-diyl)phosphite] (B), bis(2,4-di-t-butylphenyl)octylphosphite, poly(4,4'-{2,2'-dimethyl-5,5'-di-t-butylphenylsulfide-}octylphosphite), poly(4,4'{-isopropylidenediphenol}-octylphosphite), poly(4,4'-{isopropylidenebis[2,6-dibromophenol]}-octylphosphite), poly(4,4'-{2,2'-dimethyl-5,5'-di-t-butylphenylsulfide}-pentaerythrityl diphosphite),

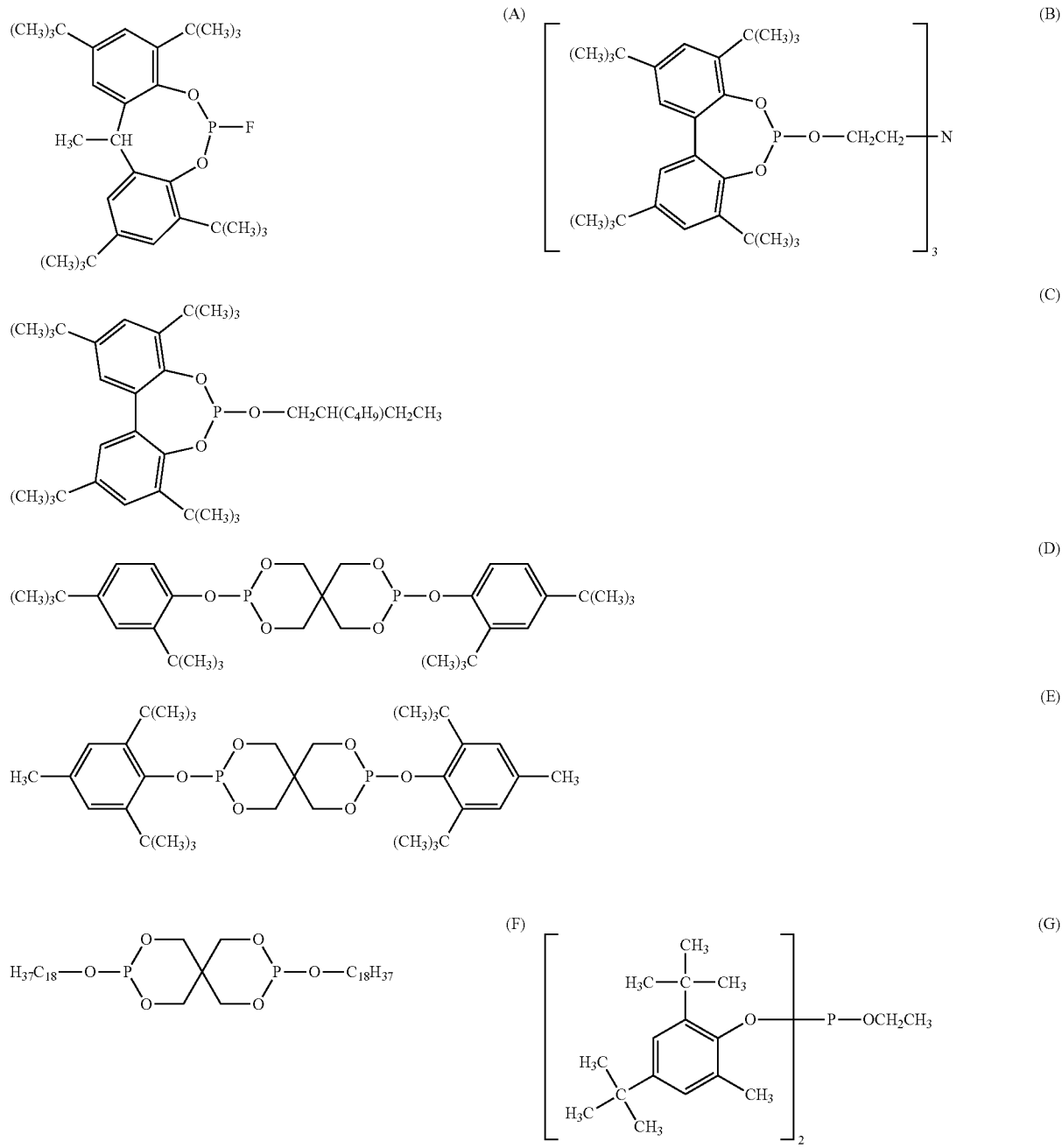

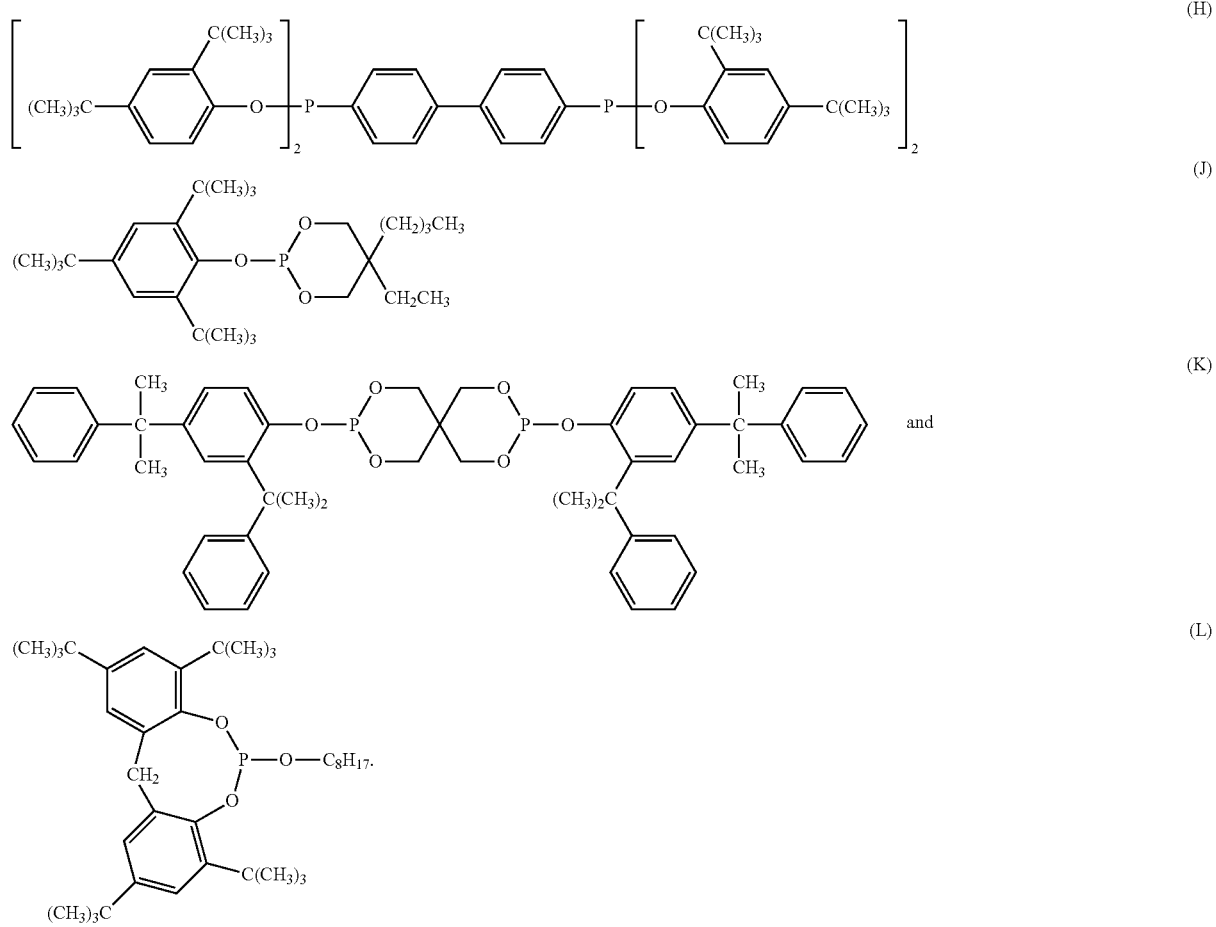

Hindered phenolic antioxidants include for example tris (3,5-di-tert-butyl-4-hydroxybenzyl)isocyanurate, 1,3,5-tris-(3,5-di-tert-butyl-4-hydroxybenzyl)-2,4,6-trimethylbenzene, the calcium salt of the monoethyl ester of 3,5-di-tert-butyl-4-hydroxybenzylphosphonic acid, pentaerythritol tetrakis [3-(3,5-di-tert-butyl-4-hydroxyphenyl)propionate] or octadecyl 3-(3,5-di-tert-butyl-4-hydroxyphenyl)propionate.

Hindered amine light stabilizers include for example
the condensate of 1-(2-hydroxyethyl)-2,2,6,6-tetramethyl-4-hydroxypiperidine and succinic acid, MW 3100-4000

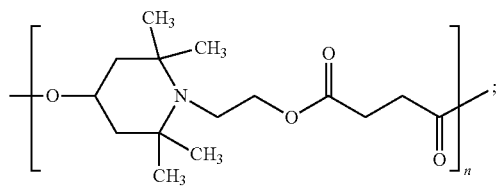

linear condensates of N,N'-bis(2,2,6,6-tetramethyl-4-piperidyl)-hexamethylenediamine and 4-tert-octylamino-2,6-dichloro-1,3,5-triazine, MW 1200-3100

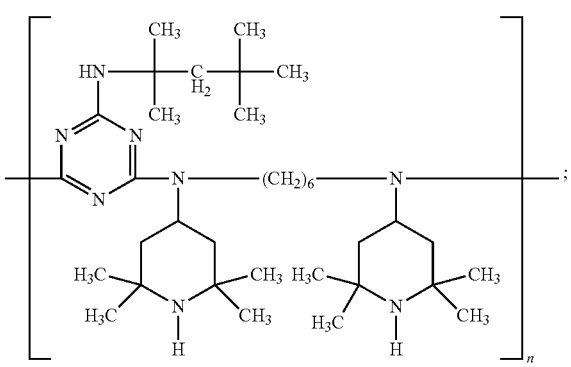

the condensate of 2-chloro-4,6-di-(4-n-butylamino-1,2,2,6,6-pentamethylpiperidyl)-1,3,5-triazine and 1,2-bis-(3-aminopropylamino)ethane,

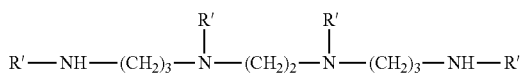

where R' is

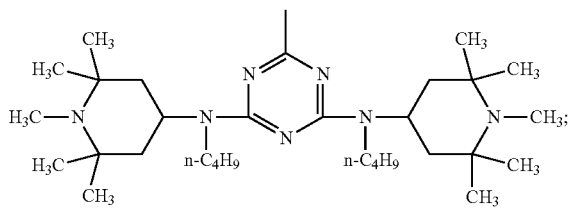

the oligomeric compound which is the condensation product of 4,4'-hexa-methylenebis(amino-2,2,6,6-tetramethylpiperidine) and 2,4-dichloro-6-[(2,2,6,6-tetramethylpiperidin-4-yl)butylamino]-s-triazine end-capped with 2-chloro-4,6-bis(dibutyl-amino)-s-triazine, MW 2600-3400

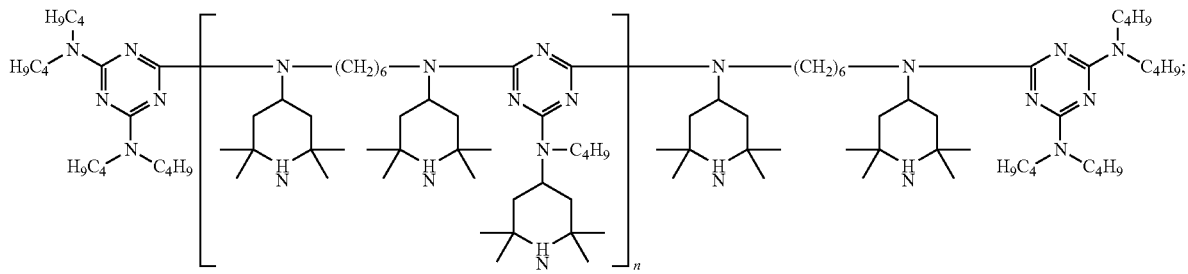

product obtained by reacting a product, obtained by reacting 1,2-bis(3-amino-propylamino)ethane with cyanuric chloride, with (2,2,6,6-tetramethylpiperidin-4-yl)butyl-amine,

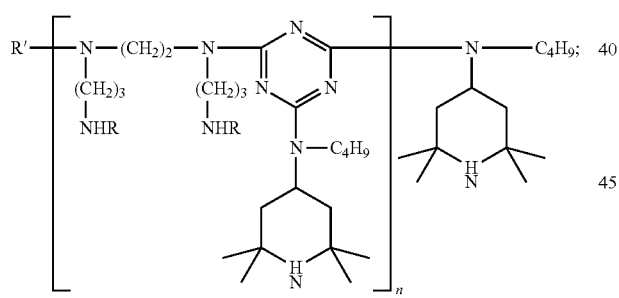

where R'=R or H
and where R=

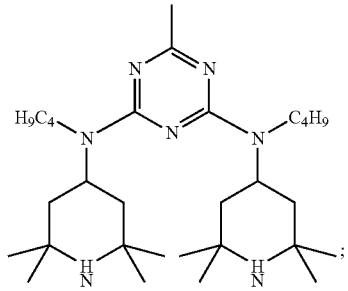

linear condensates of N,N'-bis-(2,2,6,6-tetramethyl-4-piperidyl)-hexamethylenediamine and 4-morpholino-2,6-dichloro-1,3,5-triazine,

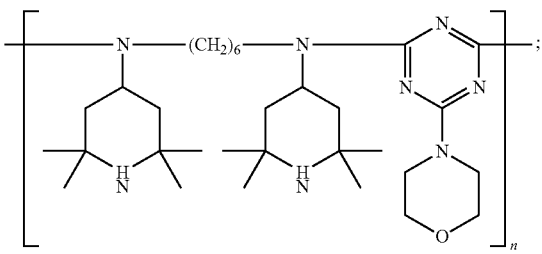

linear condensates of N,N'-bis-(1,2,2,6,6-pentamethyl-4-piperidyl)-hexamethylenediamine and 4-morpholino-2,6-dichloro-1,3,5-triazine,

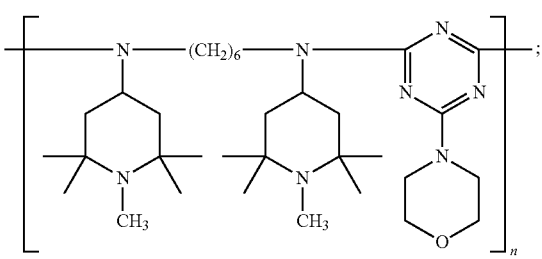

a reaction product of 7,7,9,9-tetramethyl-2-cycloundecyl-1-oxa-3,8-diaza-4-oxospiro[4,5]decane and epichlorohydrin,

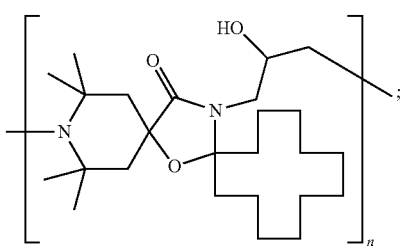

reaction product of maleic acid anhydride-$C_{18}$-$C_{22}$-olefin-copolymer with 2,2,6,6-tetramethyl-4-aminopiperidine,

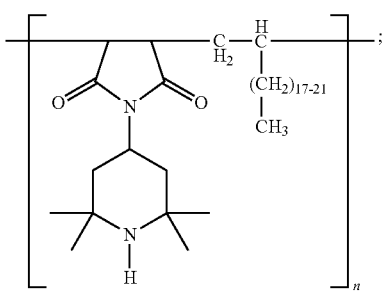

and the oligomeric compound which is the condensation product of 4,4'-hexa-methylenebis(amino-1,2,2,6,6-pentaamethylpiperidine) and 2,4-dichloro-6-[(1,2,2,6,6-pentaamethylpiperidin-4-yl)butylamino]-s-triazine end-capped with 2-chloro-4,6-bis(dibutylamino)-s-triazine,

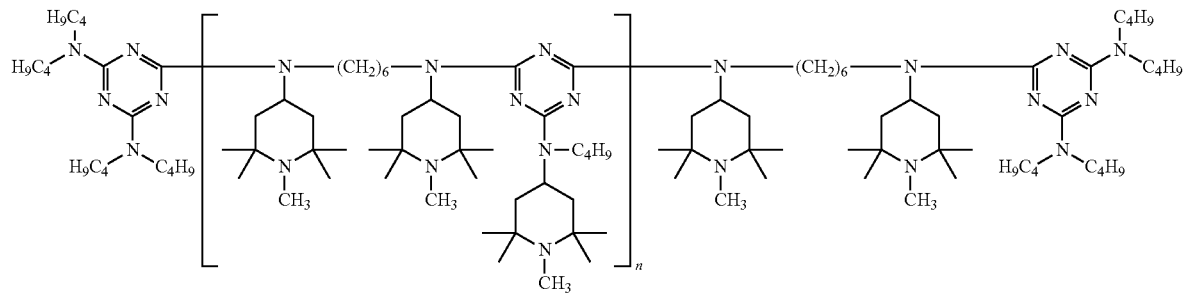

where n is an integer such that the total molecular weight is above about 1000 g/mole.

The additional useful sterically hindered amines are those not of the class of the N-hydrocarbyloxy hindered amines specifically mentioned above (non-N-hydrocarbyloxy hindered amine light stabilizers). That is, hindered amines that are of the >NH, >N-hydrocarbyl or >NOacyl classes. The >NOacyl hindered amines are disclosed for example in U.S. pub. No. 2010/327487.

Hydroxylamine stabilizers are for example N,N-dibenzylhydroxylamine, N,N-diethylhydroxylamine, N,N-dioctylhydroxylamine, N,N-dilaurylhydroxylamine, N,N-didodecylhydroxylamine, N,N-ditetradecylhydroxylamine, N,N-dihexadecylhydroxylamine, N,N-dioctadecylhydroxylamine, N-hexadecyl-N-tetradecylhydroxylamine, N-hexadecyl-N-heptadecylhydroxylamine, N-hexadecyl-N-octadecylhydroxylamine, N-heptadecyl-N-octadecylhydroxylamine, N-methyl-N-octadecylhydroxylamine or N,N-di(hydrogenated tallow) hydroxylamine.

The amine oxide stabilizer is for example GENOX EP, a di($C_{16}$-$C_{18}$)alkyl methyl amine oxide, CAS #204933-93-7.

Benzofuranone stabilizers are for example 3-(4-(2-acetoxyethoxy)phenyl)-5,7-di-tert-butyl-benzofuran-2-one, 5,7-di-tert-butyl-3-(4-(2-stearoyloxyethoxy)phenyl)benzofuran-2-one, 3,3'-bis(5,7-di-tert-butyl-3-(4-(2-hydroxyethoxy)phenyl)benzofuran-2-one), 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one or 3-(2,3-dimethylphenyl)-5,7-di-tert-butyl-benzofuran-2-one.

Benzoate UV absorbers are for instance esters of substituted and unsubstituted benzoic acids, as for example 4-tert-butylphenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

Hydroxyphenylbenzotriazole, hydroxyphenyltriazine and benzophenone UV absorbers are well known and are disclosed for instance in U.S. Pat. No. 6,444,733.

Colorants, pigments and fillers may also be added to the present polymer substrates.

Suitable pigments are inorganic pigments, such as titanium dioxide in its three crystalline forms: rutile, anatase, or brookite, ultramarine blue, iron oxides, bismuth vanadates, carbon black, effect pigments including metallic pigments such as aluminum flake and pearlescent pigments such as micas, and organic pigments, for example phthalocyanines, perylenes, azo compounds, isoindolines, quinophthalones, diketopyrrolopyrroles, quinacridones, dioxazines, and indanthrones. Pigments may be included singly or in any combination in amounts typically of up to about 5% by weight, based on the weight of the polymer substrate.

Dyes are any of the colorants which dissolve completely in the plastic used or are present in molecularly dispersed form and therefore can be used to provide high-transparency, non-diffusion coloring of polymers. Other dyes are organic compounds which fluoresce in the visible portion of the electromagnetic spectrum, e.g. fluorescent dyes. Dyes may be included singly or in any combination in amounts typically of up to about 5% by weight, based on the weight of the polymer substrate.

Particulate fillers may be present in an amount from 0.001 to 50 wt % in one embodiment, and from 0.01 to 25 wt %, based upon the weight of the polymer substrate, in another embodiment, and from 0.2 to 10 wt % in yet another embodiment. Desirable fillers include but are not limited to titanium dioxide, silicon carbide, silica (and other oxides of silica, precipitated or not), lead carbonate, zinc white, lithopone, zircon, corundum, spinel, apatite, barytes powder, barium sulfate, carbon black, dolomite, calcium carbonate, talc and hydrotalcite compounds of the ions Mg, Ca, or Zn with Al, Cr or Fe and $CO_3$ and/or $HPO_4$, hydrated or not; quartz powder, hydrochloric magnesium carbonate, glass fibers, clays, alumina, and other metal oxides and carbonates, metal hydroxides, chrome, phosphorous, silica, silicone, and blends thereof. These fillers may particularly include any other fillers and porous fillers and supports known in the art.

The incorporation of the present bismuth compounds and one or more organobromine flame retardants and optional further additives into the polymer substrate is carried out by known methods, for example before or after molding or also by applying the dissolved or dispersed additive mixture to the polymer, with or without subsequent evaporation of the solvent. Present component b) and optional further additives can also be added to the polymer in the form of a masterbatch which contains the additives in a concentration of, for example, about 2.5% to about 40% by weight. In the form of a masterbatch, the polymer substrate of the masterbatch need not be the same as the polymer of component a).

Molding is carried out with known mixing machines, for instance mixers, kneaders or extruders.

Present component b) and optional further additives can be premixed or added individually.

Present component b) and optional further additives can also be added before or during the polymerization or before crosslinking.

Present component b) and optional further additives can be incorporated into the polymer to be made flame retardant in pure form or encapsulated in waxes, oils or polymers.

Present component b) and optional further additives can also be sprayed onto the polymer substrate. They are able to dilute other additives (for example the conventional additives indicated above) or their melts so that they can be sprayed also together with these additives onto the polymer. Addition by spraying during the deactivation of the polymerization catalysts is particularly advantageous, it being possible to carry out spraying using, for example, the steam used for deactivation.

In particular, the present flame retardant additives of component b) are incorporated into the thermoplastic polymer substrate under polymer melt conditions, that is melt blending, e.g., melt blending in an extruder.

The present bismuth compounds and organobromine compounds may be added together or separately.

The present additive composition comprising bismuth compounds and organobromine compounds may be formed into for example feedable one pack systems such as pellets, pastilles, flakes or granules. The additive compositions may comprise other additives mentioned above, such as antioxidants and/or lubricants. Suitable lubricants are for instance waxes and metal soaps employed in the present examples. The one pack systems may also include other flame retardants mentioned above, for instance zinc oxide, zinc borate and the like.

The masterbatches mentioned above may be in the form of one pack systems such as pellets, pastilles, flakes or granules. In this case, the upper limit of component b) and optional further additives is 100% by weight, based on the weight of the masterbatch.

The compositions of this invention are used to prepare molded parts, films or fibers. The compositions are useful for example in electronics, electrical equipment, appliances, fabrics, carpets, wire and cable, molded articles, urban furniture, signs, building and construction materials, thin films, automotive parts and roofing membranes.

Further embodiments of this invention are corresponding flame retardant compositions and methods comprising the bismuth compounds and non-halogentated containing flame retardants. The non-halogentated flame retardants are described herein, for instance the melamine based or phosphorus based flame retardants.

The present bismuth compounds may replace all or some of antimony compound flame retardants in any situation. The present compositions and methods are preferably essentially free of antimony compounds, that is they contain less than 3% by weight antimony compounds, based on the entire composition. Preferably, the present compositions and methods contain less than 1% by weight antimony compounds. Most preferably, the present compositions and methods contain no antimony compounds.

The U.S. applications, published U.S. applications and U.S. patents discussed herein are hereby incorporated by reference.

Specifically, the following embodiments are taught:

Embodiment 1. A flame retardant composition which comprises
a) a thermoplastic polymer substrate and
b) an effective flame retarding amount of a combination of one or more bismuth compounds selected from the group consisting of bismuth oxychloride, bismuth oxyfluoride, bismuth oxybromide, bismuth oxyiodide and bismuth oxynitrate and
one or more organobromine flame retardants.

Embodiment 2. A composition according to embodiment 1 where the thermoplastic polymer substrate is selected from the group consisting of polyolefin homopolymers, polyolefin copolymers, thermoplastic olefin, polystyrene, polystyrene copolymers, polycarbonates, polyamides and polyesters.

Embodiment 3. A composition according to embodiment 1 where the thermoplastic polymer substrate is polypropylene, polyethylene, ethylene/propylene copolymer or thermoplastic olefin.

Embodiment 4. A composition according to embodiments 1, 2 or 3 where the bismuth compounds are present from about 0.5% to about 10% by weight, based on the weight of the thermoplastic polymer substrate.

Embodiment 5. A composition according to embodiments 1, 2 or 3 where the bismuth compounds are present from about 1% to about 7% by weight, based on the weight of the thermoplastic polymer substrate.

Embodiment 6. A composition according to any of embodiments 1 through 5 where the organobromine flame retardants are present from about 1% to about 40% by weight, based on the weight of the thermoplastic polymer substrate.

Embodiment 7. A composition according to any of embodiments 1 through 5 where the organobromine flame retardants are present from about 3% to about 25% by weight, based on the weight of the thermoplastic polymer substrate.

Embodiment 8. A composition according to any of embodiments 1 through 7 where the organobromine flame retardants are selected from the group consisting of
tetrabromobisphenol A (TBBPA), tetrabromophthalate esters, bis(2,3-dibromopropyloxy)tetrabromobisphenol A, brominated carbonate oligomers based on TBBPA, brominated epoxy oligomers based on condensation of TBBPA and epichlorohydrin, copolymers of TBBPA and 1,2-dibromoethane; dibromobenzoic acid, dibromostyrene (DBS) and its derivatives; ethylenebromobistetrabromophthalimide, dibromoneopentyl glycol, dibromocyclooctane, trisbromoneopentanol, tris(tribromophenyl) triazine, 2,3-dibromopropanol, tribromoaniline, tribromophenol, tetrabromocyclopentane, tetrabromobiphenyl ether, tetrabromodipentaerythritol, decabromodiphenyl ether, tetrabromophthalic anhydride, pentabromotoluene, pentabromodiphenyl ether, pentabromodiphenyl oxide, pentabromophenol, pentabromophenyl benzoate, pentabromoethylbenzene, hexabromocyclohexane, hexabromocyclooctane, hexabromocyclodecane, hexabromocyclododecane, hexabromobenzene, hexabromobiphenyl, octabromobiphenyl, octabromodiphenyl oxide, poly(pentabromobenzyl acrylate), octabromodiphenyl ether, decabromodiphenyl ethane, decabromodiphenyl, brominated trimethylphenylindan, tetrabromochlorotoluene, bis(tetrabromophthalimido)ethane, bis(tribromophenoxy)ethane, brominated polystyrene, brominated epoxy oligomer, polypentabromobenzyl acrylate, dibromopropylacrylate, dibromohexachlorocyclopentadienocyclooctane, N'-ethyl(bis)dibromononboranedicarboximide, tetrabrombisphenol S,N'N'-ethylbis(dibromononbornene)dicarboximide, hexachlorocyclopentadieno-bis-(2,3-dibromo-1-propyl)phthalate, brominated phosphates like bis(2,3-dibromopropyl)phosphate and tris(tribromoneopentyl)phosphate and tris(dichlorobromopropyl)phosphite, N,N'-ethylene-bis-(tetrabromophthalimide), tetrabromophthalic acid diol[2-hydroxypropyl-oxy-2-2-hydroxyethyl-ethyltetrabromophthalate], vinylbromide, polypentabromobenzyl acrylate, polybrominated dibenzo-p-dioxins, tris-(2,3-dibromopropyl)-isocyanurate, ethylene-bis-tetrabromophthalimide and tris(2,3-dibromopropyl)phosphate.

Embodiment 9. A composition according to any of embodiments 1 through 7 where the organobromine flame retardant is selected from the group consisting of
decabromodiphenyl ether,
tris[3-bromo-2,2-bis(bromomethyl)propyl]phosphate,
bis(2,3-dibromopropyl ether) of bisphenol A,
tetrabromobisphenol A bis(dibromopropyl ether),
brominated epoxy resin,
ethylene-bis(tetrabromophthalimide),
1,2-bis(tribromophenoxy)ethane,
tetrabromo-bisphenol A,
hexabromocyclododecane,
brominated polystyrene,
decabromodiphenyl ethane,
ethylene bis-(dibromo-norbornanedicarboximide) and tris-(2,3-dibromopropyl)-isocyanurate.

Embodiment 10. A composition according to any of embodiments 1 through 9, further comprising one or more sterically hindered hydrocarbyloxyamine stabilizers.

Embodiment 11. A composition according to any of embodiments 1 through 9, further comprising one or more sterically hindered hydrocarbyloxyamine stabilizers selected from the group consisting of
1-cyclohexyloxy-2,2,6,6-tetramethyl-4-octadecylaminopiperidine;
2,4-bis[(1-cyclohexyloxy-2,2,6,6-tetramethylpiperidin-4-yl)butylamino]-6-(2-hydroxyethyl-amino-s-triazine;
bis(1-cyclohexyloxy-2,2,6,6-tetramethylpiperidin-4-yl)adipate;
2,4-bis[(1-cyclohexyloxy-2,2,6,6-piperidin-4-yl)butylamino]-6-chloro-s-triazine;
1-(2-hydroxy-2-methylpropoxy)-4-hydroxy-2,2,6,6-tetramethylpiperidine;
1-(2-hydroxy-2-methylpropoxy)-4-oxo-2,2,6,6-tetramethylpiperidine;
1-(2-hydroxy-2-methylpropoxy)-4-octadecanoyloxy-2,2,6,6-tetramethylpiperidine;
bis(1-(2-hydroxy-2-methylpropoxy)-2,2,6,6-tetramethylpiperidin-4-yl)sebacate;
bis(1-(2-hydroxy-2-methylpropoxy)-2,2,6,6-tetramethylpiperidin-4-yl)adipate;
2,4-bis{N-[1-(2-hydroxy-2-methylpropoxy)-2,2,6,6-tetramethylpiperidin-4-yl]-N-butyl-amino}-6-(2-hydroxyethylamino)-s-triazine;
the reaction product of 2,4-bis[(1-cyclohexyloxy-2,2,6,6-piperidin-4-yl)butylamino]-6-chloro-s-triazine with N,N'-bis(3-aminopropyl)ethylenediamine) and

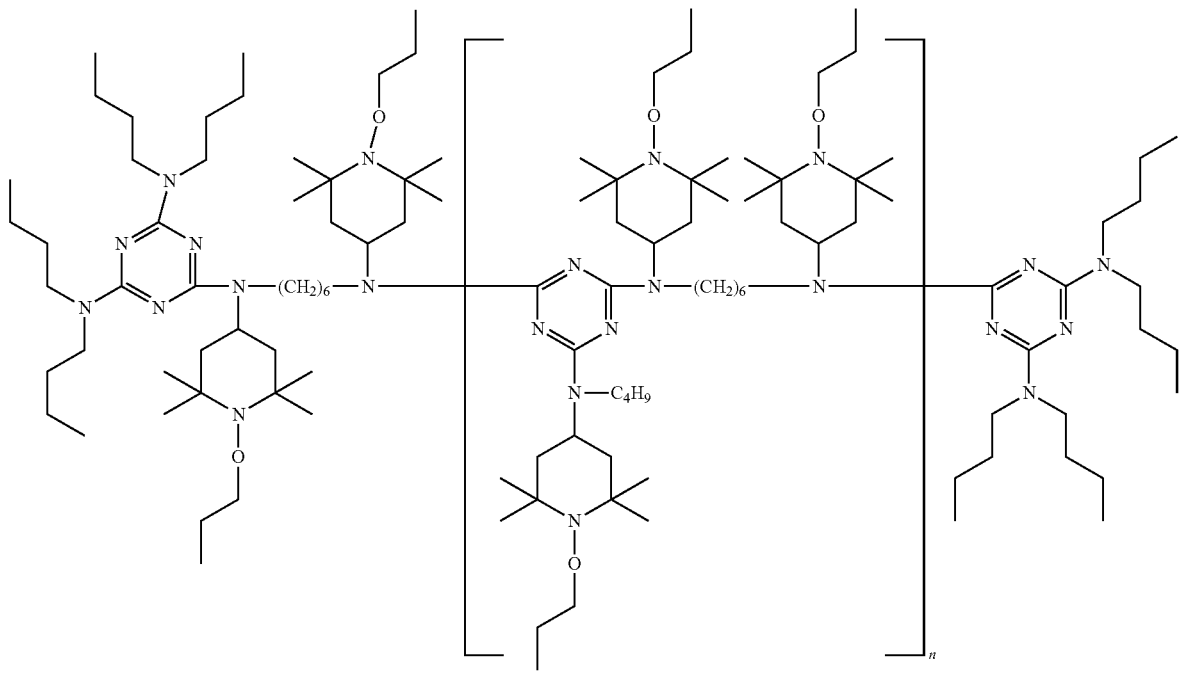

where n is from 1 to 15.

Embodiment 12. A composition according to any of embodiments 1 through 11, further comprising one or more additional flame retardants selected from the group consisting of phosphorus containing flame retardants and melamine based flame retardants.

Embodiments 13. A composition according to any of embodiments 1 through 11, further comprising one or more additional flame retardants selected from the group consisting of
chloroalkyl phosphate esters,
bis(hexachlorocyclopentadieno)cyclooctane,
chlorinated paraffins,
tetraphenyl resorcinol diphosphite,
triphenyl phosphate,
ammonium polyphosphate,
resorcinol diphosphate oligomer,
melamine cyanurate,
melamine borate,
melamine polyphosphate,
melamine phosphate,
melamine pyrophosphate and
ethylenediamine diphosphate.

Embodiment 14. A composition according to any of embodiments 1 through 13 further comprising one or more additives selected from the group consisting of pigments, dyes, plasticizers, phenolic antioxidants, thixotropic agents, levelling assistants, basic costabilizers, nitrone stabilizers, amine oxide stabilizers, benzofuranone stabilizers, UV absorbers, sterically hindered amine light stabilizers, metal passivators, metal oxides, organophosphorus compounds, lubricants and hydroxylamines.

Embodiment 15. A composition according to any of embodiments 1 through 13 further comprising one or more additives selected from the group consisting of phenolic antioxidants, calcium stearate, zinc stearate, phosphite or phosphonite stabilizers, benzofuranone stabilizers, 2-(2'-hydroxyphenyl)benzotriazole, 2-(2-hydroxyphenyl)-1,3,5-triazine or benzoate UV absorbers and sterically hindered amine light stabilizers.

Embodiment 16. A flame retardant additive composition comprising one or more bismuth compounds selected from the group consisting of bismuth oxychloride, bismuth oxyfluoride, bismuth oxybromide, bismuth oxyiodide and bismuth oxynitrate and one or more organobromine flame retardants.

Embodiment 17. An additive composition according to embodiment 16 where the organobromine flame retardants are selected from the group consisting of
tetrabromobisphenol A (TBBPA), tetrabromophthalate esters, bis(2,3-dibromopropyloxy)tetrabromobisphenol A, brominated carbonate oligomers based on TBBPA, brominated epoxy oligomers based on condensation of TBBPA and epichlorohydrin, copolymers of TBBPA and 1,2-dibromoethane; dibromobenzoic acid, dibromostyrene (DBS) and its derivatives; ethylenebromobistetrabromophthalimide, dibromoneopentyl glycol, dibromocyclooctane, trisbromoneopentanol, tris(tribromophenyl) triazine, 2,3-dibromopropanol, tribromoaniline, tribromophenol, tetrabromocyclopentane, tetrabromobiphenyl ether, tetrabromodipentaerythritol, decabromodiphenyl ether, tetrabromophthalic anhydride, pentabromotoluene, pentabromodiphenyl ether, pentabromodiphenyl oxide, pentabromophenol, pentabromophenyl benzoate, pentabromoethylbenzene, hexabromocyclohexane, hexabromocyclooctane, hexabromocyclodecane, hexabromocyclododecane, hexabromobenzene, hexabromobiphenyl, octabromobiphenyl, octabromodiphenyl oxide, poly (pentabromobenzyl acrylate), octabromodiphenyl ether, decabromodiphenyl ethane, decabromodiphenyl, brominated trimethylphenylindan, tetrabromochlorotoluene, bis(tetrabromophthalimido)ethane, bis(tribromophenoxy) ethane, brominated polystyrene, brominated epoxy oligomer, polypentabromobenzyl acrylate, dibromopropylacrylate, dibromohexachlorocyclopentadienocyclooctane, N'-ethyl(bis)dibromononboranedicarboximide, tetrabrombisphenol S,N'N'-ethylbis(dibromononbornene) dicarboximide, hexachlorocyclopentadieno-bis-(2,3-dibromo-1-propyl)phthalate, brominated phosphates like bis(2,3-dibromopropyl)phosphate and tris(tribromoneopentyl)phosphate and tris(dichlorobromopropyl)phosphite, N,N'-ethylene-bis-(tetrabromophthalimide), tetrabromophthalic acid diol[2-hydroxypropyl-oxy-2-2-hydroxyethyl-ethyltetrabromophthalate], vinylbromide, polypentabromobenzyl acrylate, polybrominated dibenzo-p-dioxins, tris-(2,3-dibromopropyl)-isocyanurate, ethylene-bis-tetrabromophthalimide and tris(2,3-dibromopropyl)phosphate Embodiment 18. An additive composition according to embodiment 16 where the organobromine flame retardants are selected from the group consisting of
decabromodiphenyl ether,
tris[3-bromo-2,2-bis(bromomethyl)propyl]phosphate,
bis(2,3-dibromopropyl ether) of bisphenol A,
tetrabromobisphenol A bis(dibromopropyl ether),
brominated epoxy resin,
ethylene-bis(tetrabromophthalimide),
1,2-bis(tribromophenoxy)ethane,
tetrabromo-bisphenol A,
hexabromocyclododecane,
brominated polystyrene,
decabromodiphenyl ethane,
ethylene bis-(dibromo-norbornanedicarboximide) and
tris-(2,3-dibromopropyl)-isocyanurate.

Embodiment 19. An additive composition according to embodiment 16, 17 or 18 further comprising one or more additives selected from the group consisting of pigments, dyes, plasticizers, phenolic antioxidants, thixotropic agents, levelling assistants, basic costabilizers, nitrone stabilizers, amine oxide stabilizers, benzofuranone stabilizers, UV absorbers, sterically hindered amine light stabilizers, metal passivators, metal oxides, organophosphorus compounds, lubricants and hydroxylamines.

Embodiment 20. An additive composition according to any of embodiments 16 through 19, which is in the form of a one pack system selected from the group consisting of pellets, pastilles, flakes and granules.

Embodiment 21. A method for providing a flame retardant polymer composition, said method comprising incorporating into a thermoplastic polymer substrate an effective flame retarding amount of a combination of
one or more bismuth compounds selected from the group consisting of bismuth oxychloride, bismuth oxyfluoride, bismuth oxybromide, bismuth oxyiodide and bismuth oxynitrate and
one or more organobromine flame retardants.

Embodiment 22. A method according to embodiment 21 which comprises incorporating into the thermoplastic polymer substrate a feedable one pack system comprising the one or more bismuth compounds and the one or more organobromine flame retardants.

Embodiment 23. A method according to emboiment 22 where the feedable one pack system is selected from the group consisting of pellets, pastilles, flakes and granules.

Embodiment 24. A composition according to any of embodiments 1 through 15, further comprising one or more compounds selected from the group consisting of zinc oxide, zinc borate, antimony oxide, aluminum hydroxide, magnesium hydroxide, aluminum trihydroxide, alumina hydrate, alumina trihydrate, magnesium oxide, magnesium chloride, talcum, alumina magnesium, calcium silicate, sodium silicate, zeolite, sodium carbonate, calcium carbonate, ammonium molybdate, iron oxide, copper oxide, zinc phosphate, zinc chloride, clay, sodium dihydrogen phosphate, tin, vanadium compounds, molybdenum and zinc.

Embodiment 25. A composition according to any of embodiments 1 through 15, further comprising zinc oxide.

The additive composition and method embodiments 16-23 may be expanded to include all embodiments and combinations of the composition embodiments 1-15 and 24-25.

Embodiment 26. A flame retardant composition comprising a thermoplastic polymer substrate and an effective flame retarding amount of one or more bismuth compounds selected from the group consisting of bismuth oxychloride, bismuth oxyfluoride, bismuth oxybromide, bismuth oxyiodide and bismuth oxynitrate.

Embodiment 27. A composition according to embodiment 26 where the bismuth compounds are present at weight levels of about 0.5% to about 20% by weight, preferably from about 1% to about 15% by weight, based on the weight of the thermoplastic polymer.

Embodiment 28. A method for providing a flame retardant polymer composition, said method comprising incorporating into a thermoplastic polymer substrate an effective flame retarding amount of a bismuth compound selected from the group consisting of bismuth oxychloride, bismuth oxyfluoride, bismuth oxybromide, bismuth oxyiodide and bismuth oxynitrate.

Embodiment 29. Use of a combination of one or more bismuth compounds selected from the group consisting of bismuth oxychloride, bismuth oxyfluoride, bismuth oxybromide, bismuth oxyiodide and bismuth oxynitrate and one or more organobromine flame retardants towards providing flame retardancy to a thermoplastic polymer substrate.

Embodiment 30. Use of one or more bismuth compounds selected from the group consisting of bismuth oxychloride, bismuth oxyfluoride, bismuth oxybromide, bismuth oxyiodide and bismuth oxynitrate towards providing flame retardancy to a thermoplastic polymer substrate.

The use embodiments 29-30 may be expanded to include all embodiments and combinations of the composition embodiments 1-15 and 24-25.

The effective flame retarding amount of component b) is that needed to show flame retarding efficacy as measured by one of the standard methods used to assess flame retardancy. These include the NFPA 701 Standard Methods of Fire Tests for Flame-Resistant Textiles and Films, 1989 and 1996 editions; the UL 94 Test for Flammability of Plastic Materials for Parts in Devices and Appliances, 5th Edition, Oct. 29, 1996; Limiting Oxygen Index (L01), ASTM D-2863; and Cone Calorimetry, ASTM E-1354. Ratings according to the UL 94 V test are as compiled in the following table:

| Rating | Afterflame time | Burning drips | Burn to Clamp |
|---|---|---|---|
| V-0 | <10 s | no | no |
| V-1 | <30 s | no | no |
| V-2 | <30 s | yes | no |
| Fail | <30 s | | yes |
| Fail | >30 s | | no |

Example 1

Polypropylene homopolymer, PROFAX 6301, specific gravity 0.900, melt flow rate 12.0 (230° C./2.16 kg), is compounded in a small laboratory twin screw extruder (Brabender) at 25 rpm with zone1=160° C., zone2=180° C., zone3=200° C., zone4=200° C., zone5=200° C. The formulations below are compounded followed by injection molding at 187° C. Formulations 1-5 are of the present invention. Flame retardant results are also below. A minimum of 2 ten second flame applications to 3.2 mm thick by 12.7 mm wide polypropylene strips are performed to determine if the samples could self-extinguish and resist producing flaming drips. A third ten second flame application is added to determine total performance level. The control is a certified UL 94 V0 formulation of polypropylene. All samples exhibited no flaming drips and did self-extinguish.

The formulations also contain 0.4% phenolic antioxidant IRGANOX 1010, 0.3% ethylene bis-stearamide wax and 0.2% calcium stearate.

Deca=decabromodiphenyl ether

ATO=antimony trioxide

BiOCl, bismuth oxychloride, is MEARLITE LBU, from BASF.

| formulation | deca | ATO | BiOCl | UL 94 |
|---|---|---|---|---|
| control | 17.60% | 7% | — | V0 |
| 1 | 17.85% | — | 8% | V0 |
| 2 | 17.60% | — | 7% | V0 |
| 3 | 17.60% | — | 6% | V0 |
| 4 | 17.60% | — | 5% | V0 |
| 5 | 17.60% | — | 4% | V0 |

The present formulations 1-5 also show good results regarding tensile strength (MPa) and charpy impact (JM) relative to the control. Percents are weight percent with the remainder being polypropylene.

Example 2

A mixture of 17.6 parts decabromodiphenyl ether, 4 parts BiOCl, 0.4 parts IRGANOX 1010, 0.3 parts ethylene bis-stearamide and 0.2 parts calcium stearate is homogenously mixed and fed gravimetrically to a twin screw extruder. The mixture is melt extruded through nozzles. Immediately after the nozzles the extrudates are cut while in the plastic state and subsequently cooled in a fluidized bed condenser. Regularly shaped granules are produced. The granules are compounded with polypropylene as in Example 1.

Example 3

Example 1 is repeated with the following formulations and results:

| formulation | deca | BiOCl | $Bi_2O_3$ | Cl Paraffin | UL 94 |
|---|---|---|---|---|---|
| 1 | 17.60% | 2% | — | — | V0 |
| 2 | 17.60% | — | 2% | — | V2 |
| 3 | — | 2% | — | 17.60% | V2 |

ClParaffin is chlorinated paraffin (70% Cl). Deca is decabromodiphenyl ether. Each formulation also contains 0.4% phenolic antioxidant IRGANOX 1010, 0.3% ethylene bis-stearamide and 0.2% calcium stearate. Percents are by weight, remainder is polypropylene.

Present formulation 1 far outperforms combinations of chloroparaffin/BiOCl and decabromodiphenyl ether/$Bi_2O_3$.

When formulation 1 is repeated, replacing BiOCl with 2% (same loading) each of BiOF, BiOBr, BiOI and $BiO(NO_3)$, UL 94 ratings of V0 are also achieved. These are formulations 4-7.

Example 4

Example 1 is repeated, with a formulation containing 10% by weight bismuth oxybromide and no organobromine flame retardant. A UL 94 rating of V2 is achieved.

A further subject of this invention is a flame retardant composition comprising a thermoplastic polymer substrate and an effective flame retarding amount of one or more bismuth compounds selected from the group consisting of bismuth oxychloride, bismuth oxyfluoride, bismuth oxybromide, bismuth oxyiodide and bismuth oxynitrate. Preferably bismuth oxybromide.

The bismuth compounds are present at weight levels of about 0.5%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19% or about 20% by weight, based on the weight of the thermoplastic polymer, and weight levels in between.

A further subject of this invention is a method for providing a flame retardant polymer composition, said method comprising incorporating into a thermoplastic polymer substrate an effective flame retarding amount of one or more bismuth compounds selected from the group consisting of bismuth oxychloride, bismuth oxyfluoride, bismuth oxybromide, bismuth oxyiodide and bismuth oxynitrate.

These compositions and methods achieve UL 94 ratings of V0, V1 or V2.

This example is repeated, replacing polypropylene as the polymer substrate with each of polyethylene, high impact polystyrene, acrylontitrile-butadiene-styrene, polycarbonate, polycarbonate/ABS, polystyrene, nylon (polyamide), thermoplastic polyurethane, thermoplastic elastomer, thermoplastic olefin, polymethylmethacrylate, rubber, polyester, polyacrylonitrile and polyoxymethylene.

Example 5

Formulations 1 and 4-7 of Example 3 are repeated, replacing polypropylene as the polymer substrate with each of polyethylene, high impact polystyrene, acrylontitrile-butadiene-styrene, polycarbonate, polycarbonate/ABS, polystyrene, nylon (polyamide), thermoplastic polyurethane, thermoplastic elastomer, thermoplastic olefin, polymethylmethacrylate, rubber, polyester, polyacrylonitrile and polyoxymethylene.

Example 6

High density polyethylene (HDPE) samples are compounded at 200° C. in a laboratory extruder and injection molded into strips according to Example 1. The samples contain 25% decabromodiphenyl ether, 2% BiOCl and loadings of ZnO of from 4% to 10%. Samples also contain 0.4% IRGANOX 1010, 0.3% ethylene bis-stearamide wax and 0.2% calcium stearate. Percents are by weight, remainder being HDPE. The strips all achieve a UL 94 V0 rating.

Example 7

Nylon 6 samples are compounded at 250° C. in a laboratory extruder and injection molded into strips according to Example 1. The samples contain 20% brominated polystyrene, 2% BiOCl and loadings of ZnO of from 2% to 10%. Samples also contain 0.4% IRGANOX 1010, 0.3% ethylene bis-stearamide wax and 0.2% calcium stearate. Percents are by weight, remainder being nylon 6. The strips all achieve a UL 94 V0 rating.

Example 8

Example 6 is repeated, replacing HDPE as the polymer substrate with low density polyethylene, polypropylene, high impact polystyrene, acrylontitrile-butadiene-styrene, polycarbonate, polycarbonate/ABS, polystyrene, nylon (polyamide), thermoplastic polyurethane, thermoplastic elastomer, thermoplastic olefin, polymethylmethacrylate, rubber, polyester, polyacrylonitrile and polyoxymethylene.

Example 9

Examples 6, 7 and 8 are repeated, replacing ZnO with zinc borate, antimony oxide, aluminum hydroxide, magnesium hydroxide, aluminum trihydroxide, alumina hydrate, alumina trihydrate, magnesium oxide, magnesium chloride, talcum, alumina magnesium, calcium silicate, sodium silicate, zeolite, sodium carbonate, calcium carbonate, ammonium molybdate, iron oxide, copper oxide, zinc phosphate, zinc chloride, clay, sodium dihydrogen phosphate, tin, molybdenum, vanadium compounds and zinc.

The invention claimed is:
1. A flame retardant composition which comprises
   a) a thermoplastic polymer substrate and
   b) an effective flame retarding amount of a combination of
      one or more bismuth compounds selected from the group consisting of bismuth oxychloride, bismuth oxyfluoride, bismuth oxybromide, bismuth oxyiodide and bismuth oxynitrate and
      one or more organobromine flame retardants.
2. A composition according to claim 1 where the thermoplastic polymer substrate is selected from the group consisting of polyolefin homopolymers, polyolefin copolymers, thermoplastic olefin, polystyrene, polystyrene copolymers, polycarbonates, polyamides and polyesters.
3. A composition according to claim 1 where the thermoplastic polymer substrate is polypropylene, polyethylene, ethylene/propylene copolymer or thermoplastic olefin.

4. A composition according to claim 1 where said bismuth compounds are present from about 0.5% to about 10% by weight, based on the weight of the thermoplastic polymer substrate.

5. A composition according to claim 1 where said bismuth compounds are present from about 1% to about 7% by weight, based on the weight of the thermoplastic polymer substrate.

6. A composition according to claim 1 where the organobromine flame retardants are present from about 1% to about 40% by weight, based on the weight of the thermoplastic polymer substrate.

7. A composition according to claim 6 where the organobromine flame retardants are present from about 3% to about 25% by weight, based on the weight of the thermoplastic polymer substrate.

8. A composition according to claim 1 where the organobromine flame retardants are selected from the group consisting of tetrabromobisphenol A (TBBPA), tetrabromophthalate esters, bis(2,3-dibromopropyloxy)tetrabromobisphenol A, brominated carbonate oligomers based on TBBPA, brominated epoxy oligomers based on condensation of TBBPA and epichlorohydrin, copolymers of TBBPA and 1,2-dibromoethane; dibromobenzoic acid, dibromostyrene (DBS) and its derivatives; ethylenebromobistetrabromophthalimide, dibromoneopentyl glycol, dibromocyclooctane, trisbromoneopentanol, tris(tribromophenyl)triazine, 2,3-dibromopropanol, tribromoaniline, tribromophenol, tetrabromocyclopentane, tetrabromobiphenyl ether, tetrabromodipentaerythritol, decabromodiphenyl ether, tetrabromophthalic anhydride, pentabromotoluene, pentabromodiphenyl ether, pentabromodiphenyl oxide, pentabromophenol, pentabromophenyl benzoate, pentabromoethylbenzene, hexabromocyclohexane, hexabromocyclooctane, hexabromocyclodecane, hexabromocyclododecane, hexabromobenzene, hexabromobiphenyl, octabromobiphenyl, octabromodiphenyl oxide, poly(pentabromobenzyl acrylate), octabromodiphenyl ether, decabromodiphenyl ethane, decabromodiphenyl, brominated trimethylphenylindan, tetrabromochlorotoluene, bis(tetrabromophthalimido)ethane, bis(tribromophenoxy)ethane, brominated polystyrene, brominated epoxy oligomer, polypentabromobenzyl acrylate, dibromopropylacrylate, dibromohexachlorocyclopentadienocyclooctane, N'-ethyl(bis)dibromononboranedicarboximide, tetrabrombisphenol S, N'N'-ethylbis(dibromononbornene) dicarboximide, hexachlorocyclopentadieno-bis-(2,3-dibromo-1-propyl)phthalate, brominated phosphates like bis(2,3-dibromopropyl)phosphate and tris(tribromoneopentyl)phosphate and tris(dichlorobromopropyl) phosphite, N,N'-ethylene-bis-(tetrabromophthalimide), tetrabromophthalic acid diol[2-hydroxypropyl-oxy-2-2-hydroxyethyl-ethyltetrabromophthalate], vinylbromide, polypentabromobenzyl acrylate, polybrominated dibenzo-p-dioxins, tris-(2,3-dibromopropyl)-isocyanurate, ethylene-bis-tetrabromophthalimide and tris(2,3-dibromopropyl)phosphate.

9. A composition according to claim 1 where the organobromine flame retardants are selected from the group consisting of decabromodiphenyl ether, tris[3-bromo-2,2-bis(bromomethyl)propyl] phosphate, bis(2,3-dibromopropyl ether) of bisphenol A, tetrabromobisphenol A bis(dibromopropyl ether), brominated epoxy resin, ethylene-bis(tetrabromophthalimide), 1,2-bis(tribromophenoxy)ethane, tetrabromo-bisphenol A, hexabromocyclododecane, brominated polystyrene, decabromodiphenyl ethane, ethylene bis-(dibromo-norbornanedicarboximide) and tris-(2,3-dibromopropyl)-isocyanurate.

10. A composition according to claim 1, further comprising one or more sterically hindered hydrocarbyloxyamine stabilizers.

11. A composition according to claim 10, further comprising one or more sterically hindered hydrocarbyloxyamine stabilizers selected from the group consisting of 1-cyclohexyloxy-2,2,6,6-tetramethyl-4-octadecylaminopiperidine;

2,4-bis[(1-cyclohexyloxy-2,2,6,6-tetramethylpiperidin-4-yl)butylamino]-6-(2-hydroxyethyl-amino-s-triazine;

bis(1-cyclohexyloxy-2,2,6,6-tetramethylpiperidin-4-yl) adipate;

2,4-bis[(1-cyclohexyloxy-2,2,6,6-piperidin-4-yl)butylamino]-6-chloro-s-triazine;

1-(2-hydroxy-2-methylpropoxy)-4-hydroxy-2,2,6,6-tetramethylpiperidine;

1-(2-hydroxy-2-methylpropoxy)-4-oxo-2,2,6,6-tetramethylpiperidine;

1-(2-hydroxy-2-methylpropoxy)-4-octadecanoyloxy-2,2,6,6-tetramethylpiperidine;

bis(1-(2-hydroxy-2-methylpropoxy)-2,2,6,6-tetramethylpiperidin-4-yl) sebacate;

bis(1-(2-hydroxy-2-methylpropoxy)-2,2,6,6-tetramethylpiperidin-4-yl) adipate;

2,4-bis{N-[1-(2-hydroxy-2-methylpropoxy)-2,2,6,6-tetramethylpiperidin-4-yl]-N-butyl-amino}-6-(2-hydroxyethylamino)-s-triazine;

the reaction product of 2,4-bis[(1-cyclohexyloxy-2,2,6,6-piperidin-4-yl)butylamino]-6-chloro-s-triazine with N,N'-bis(3-aminopropyl)ethylenediamine) and

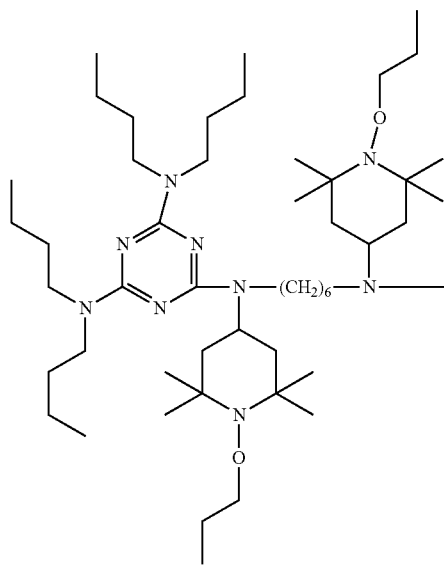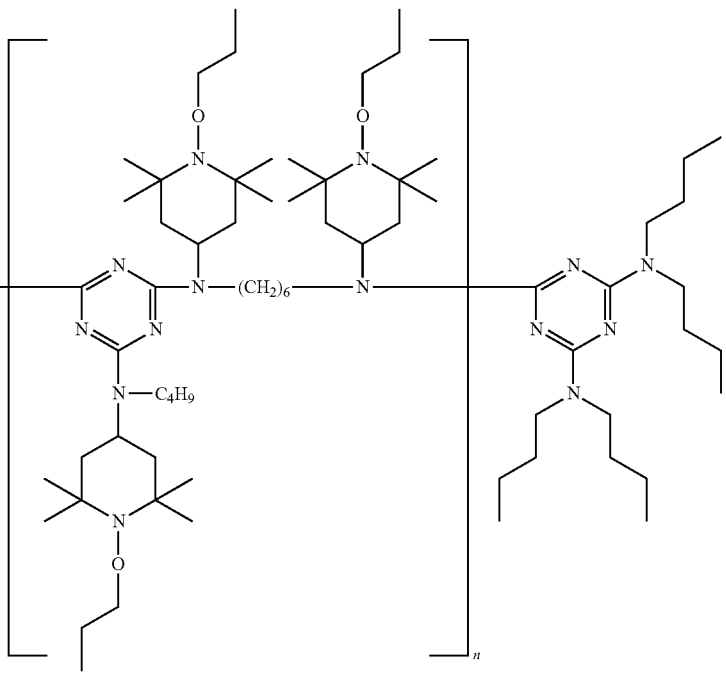

where n is from 1 to 15.

12. A composition according to claim 1, further comprising one or more additional flame retardants selected from the group consisting of phosphorus containing flame retardants and melamine based flame retardants.

13. A composition according to claim 1, further comprising one or more additional flame retardants selected from the group consisting of
chloroalkyl phosphate esters,
bis(hexachlorocyclopentadieno)cyclooctane,
chlorinated paraffins,
tetraphenyl resorcinol diphosphite,
triphenyl phosphate,
ammonium polyphosphate,
resorcinol diphosphate oligomer,
melamine cyanurate,
melamine borate,
melamine polyphosphate,
melamine phosphate,
melamine pyrophosphate and
ethylenediamine diphosphate.

14. A composition according to claim 1 further comprising one or more additives selected from the group consisting of pigments, dyes, plasticizers, phenolic antioxidants, thixotropic agents, levelling assistants, basic costabilizers, nitrone stabilizers, amine oxide stabilizers, benzofuranone stabilizers, UV absorbers, sterically hindered amine light stabilizers, metal passivators, metal oxides, organophosphorus compounds, lubricants and hydroxylamines.

15. A composition according to claim 1 further comprising one or more additives selected from the group consisting of phenolic antioxidants, calcium stearate, zinc stearate, phosphite or phosphonite stabilizers, benzofuranone stabilizers, 2-(2'-hydroxyphenyl)benzotriazole, 2-(2-hydroxyphenyl)-1,3,5-triazine or benzoate UV absorbers and sterically hindered amine light stabilizers.

16. A composition according to claim 1, further comprising one or more compounds selected from the group consisting of zinc oxide, zinc borate, antimony oxide, aluminum hydroxide, magnesium hydroxide, aluminum trihydroxide, alumina hydrate, alumina trihydrate, magnesium oxide, magnesium chloride, talcum, alumina magnesium, calcium silicate, sodium silicate, zeolite, sodium carbonate, calcium carbonate, ammonium molybdate, iron oxide, copper oxide, zinc phosphate, zinc chloride, clay, sodium dihydrogen phosphate, tin, vanadium compounds, molybdenum and zinc.

17. A composition according to claim 1, further comprising zinc oxide.

* * * * *